(12) United States Patent
Choi

(10) Patent No.: US 6,310,855 B1
(45) Date of Patent: Oct. 30, 2001

(54) CARTRIDGE FOR ACCOMODATING OPTICAL DISCS OF DIFFERENT SIZES

(75) Inventor: Han-kook Choi, Suwon (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/178,487

(22) Filed: Oct. 26, 1998

(30) Foreign Application Priority Data

Dec. 31, 1997 (KR) .................................................. 97-80280

(51) Int. Cl.[7] .................................................. G11B 23/00
(52) U.S. Cl. .................................................. 369/291
(58) Field of Search .................................. 369/291, 289, 369/77.1, 292; 360/133, 137, 99.06, 99.02, 99.09; 206/308.3

(56) References Cited

U.S. PATENT DOCUMENTS

| | | | |
|---|---|---|---|
| 4,797,865 | * 1/1989 | Imai et al. | 369/39 |
| 4,928,271 | * 5/1990 | Verhagen | 369/292 |
| 5,208,802 | * 5/1993 | Suzuki et al. | 369/289 |
| 5,535,072 | * 7/1996 | Witt et al. | 460/99.06 |
| 5,574,711 | * 11/1996 | Nakamichi | 369/77.1 |
| 5,610,902 | * 3/1997 | Childers et al. | 369/289 |
| 5,867,476 | * 2/1999 | Yoshida et al. | 369/289 |
| 5,903,542 | * 5/1999 | Sandell et al. | 369/291 |
| 5,923,509 | * 7/1999 | Takahashi et al. | 360/133 |
| 6,002,556 | * 12/1999 | Oishi | 360/133 |

FOREIGN PATENT DOCUMENTS

| | | |
|---|---|---|
| 2-48287 | * 2/1990 | (JP). |
| 2-187973 | 7/1990 | (JP). |
| 6-333356 | 12/1994 | (JP). |

* cited by examiner

*Primary Examiner*—William Klimowicz
*Assistant Examiner*—Tianjie Chen
(74) *Attorney, Agent, or Firm*—Staas & Halsey LLP

(57) ABSTRACT

A cartridge to accommodate optical discs of different sizes. The cartridge includes a main case including an upper and a lower plates. An optical disc of a larger diameter is inserted directly into the main case, and an optical disc of a smaller diameter is inserted into an auxiliary case, such that the auxiliary case is received by the main case. A main shutter is movably installed on the main case, and the auxiliary case has an auxiliary shutter in which a shutter protrusion is formed. As the shutter protrusion is inserted into the main shutter, the auxiliary shutter is opened/closed by operation of the main shutter. The main case is formed with first ribs in a circular arc shape in which the optical disc of the larger diameter is accommodated, and a cover, to prevent the larger optical disc and the auxiliary case from being released therefrom, is pivotably installed on the main case. The cover is formed with second ribs in the circular arc shape. The first ribs have respectively first receiving recesses and the second ribs have second receiving recesses, and the auxiliary case is maintained in position inside the main case after being inserted into the first and the second receiving recesses.

22 Claims, 6 Drawing Sheets

CARTRIDGE FOR ACCOMODATING OPTICAL DISCS OF DIFFERENT SIZES

CROSS-REFERENCE TO RELATED APPLICATIONS

This application claims the benefit of Korean Application No. 97-80280, filed Dec. 31, 1997, in the Korean Industrial Property Office, the disclosure of which is incorporated herein by reference.

BACKGROUND OF THE INVENTION

1. Field of the Invention

The present invention relates to a cartridge, and more particularly, to a cartridge capable of accommodating discs of different sizes. A Compact Disk (CD)/Digital Video Disk (DVD) recording/reproducing player, for example, receives the cartridge loaded with a disc, to record/reproduce data from the loaded disc.

2. Description of the Prior Art

An optical disc is divided into a data area into which the data is recorded, and a hub where the data is not recorded. When the data area is damaged by dust, fingerprints, scratching, etc., an error in recording/reproducing the data to/from thereof may occur. To prevent such an error, a protective cartridge is employed.

In the cartridge, a space for accommodating the optical disc is formed by having a pair of plates made of a resin or the like. An opening for exposing the data area to an optical pick-up device is formed and is opened/closed by a shutter.

One type of optical disc has a diameter of 12 cm, and another type has a diameter of 8 cm, but generally, the cartridge is made to receive only the one having a diameter of 12 cm. When the optical disc is accommodated into the cartridge, it is loaded into the optical disc recording/reproducing device. At this time, the shutter of the cartridge is opened, and the optical disc is positioned on a turntable of a rotary device to be rotated for recording or reproduction.

At the same time, an optical pick-up device for recording/reproducing the data to/from the optical disc moves radially along the opened opening of the cartridge to record/reproduce the data to/from the optical disc.

The cartridge described as above generally receives the disc of only one predetermined size (e.g., the optical disc having a diameter of 12 cm). Therefore, when another size optical disc of, such as one having a diameter of 8 cm, is accommodated into the cartridge to be loaded into the optical disc recording/reproducing device, the optical disc cannot be safely and accurately positioned on the turntable of the rotary device.

Accordingly, to use optical discs of different sizes in one optical disc recording/reproducing device, a cartridge and a tray capable of accommodating the different sized optical discs are required.

SUMMARY OF THE INVENTION

The present invention has been made to overcome the above problem, and accordingly, it is an object of the present invention to provide a cartridge to accommodate optical discs of different sizes.

Additional objects and advantages of the invention will be set forth in part in the description which follows and, in part, will be obvious from the description, or may be learned by practice of the invention.

The above and other objects and advantages are accomplished by providing a cartridge to accommodate optical discs of different sizes including a main case having an upper plate and a lower plate coupled to the upper plate to accommodate a first optical disc, the lower plate forming a first longitudinal opening by cooperation with the upper plate; a cover pivotably mounted on the main case; an auxiliary case having a auxiliary shutter and accommodated into the main case to accommodate a second optical disc having a smaller diameter than that of the first optical disc; an opening section to open the auxiliary shutter; an accommodating section provided in the main case to accommodate the auxiliary case in the main case; and a support section provided in the main case to support the auxiliary case.

The accommodating section includes first receiving recesses respectively formed at the upper and lower plates to receive the auxiliary case, first ribs formed in a circular arc shape to support the optical disc, and guide protrusions respectively formed at the upper and lower plates in parallel with the first longitudinal opening to guide the auxiliary case.

The accommodating section further includes second ribs formed in a circular arc shape provided at the cover. The second ribs are formed with second receiving recesses into which a side of the auxiliary case is inserted. The auxiliary case is formed with a guiding recess into which the guiding protrusion is inserted.

The support section includes a plurality of tension ribs formed at the upper plate to elastically support the auxiliary case.

The opening section includes a spring mounted across the first longitudinal opening, and a main shutter elastically supported by the spring. The main shutter is slidably installed at the main case to open the auxiliary shutter, and the main shutter is formed with a second longitudinal opening. A shutter protrusion formed at the auxiliary shutter is inserted into the second longitudinal opening.

According to the present invention, optical discs of different sizes are accommodated into a tray, i.e., the compatibility of the tray is enhanced so that the cost in recording/reproducing data to/from optical discs of different sizes is reduced.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
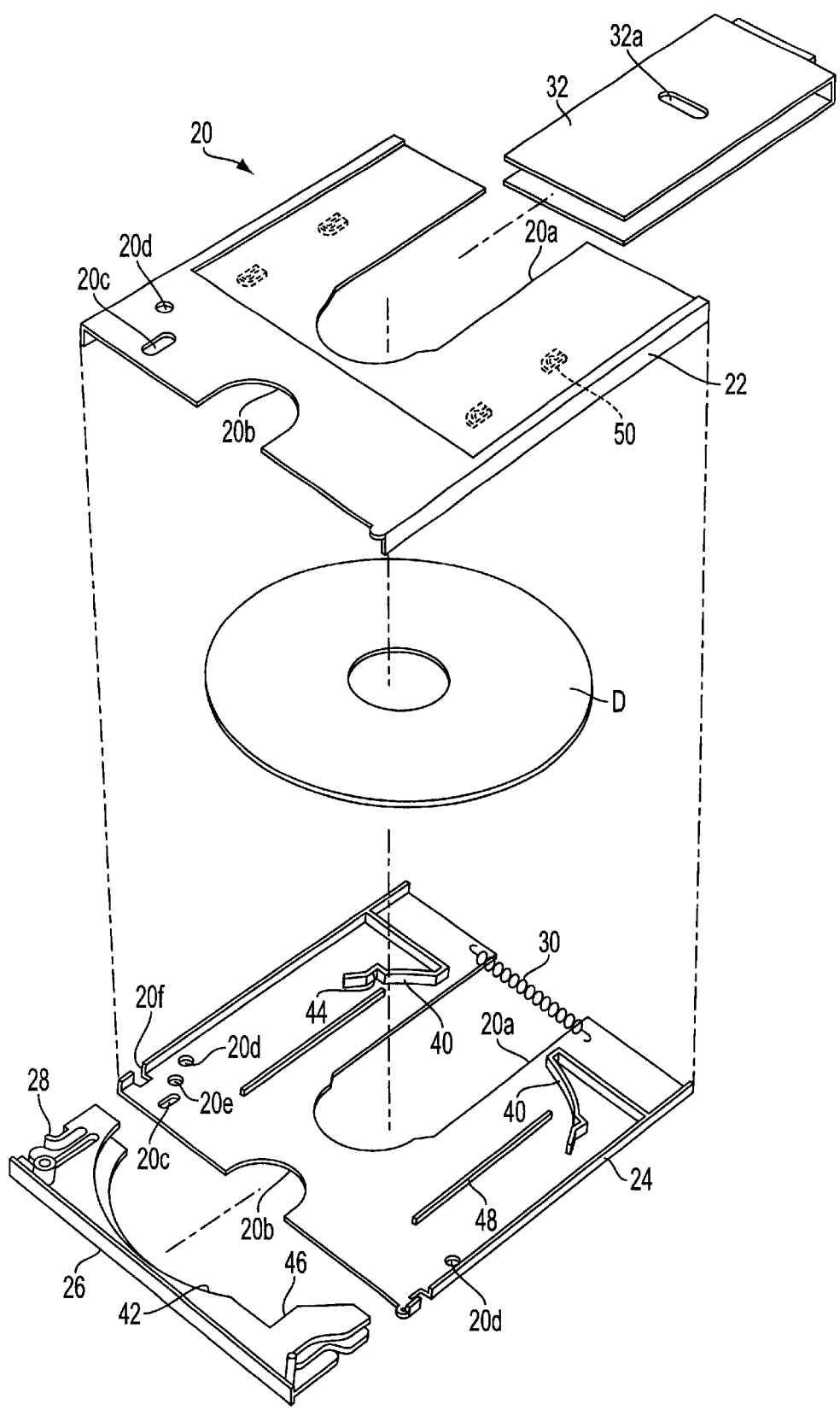
FIG. 1 is an exploded perspective view showing a cartridge to accommodate discs of different sizes according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
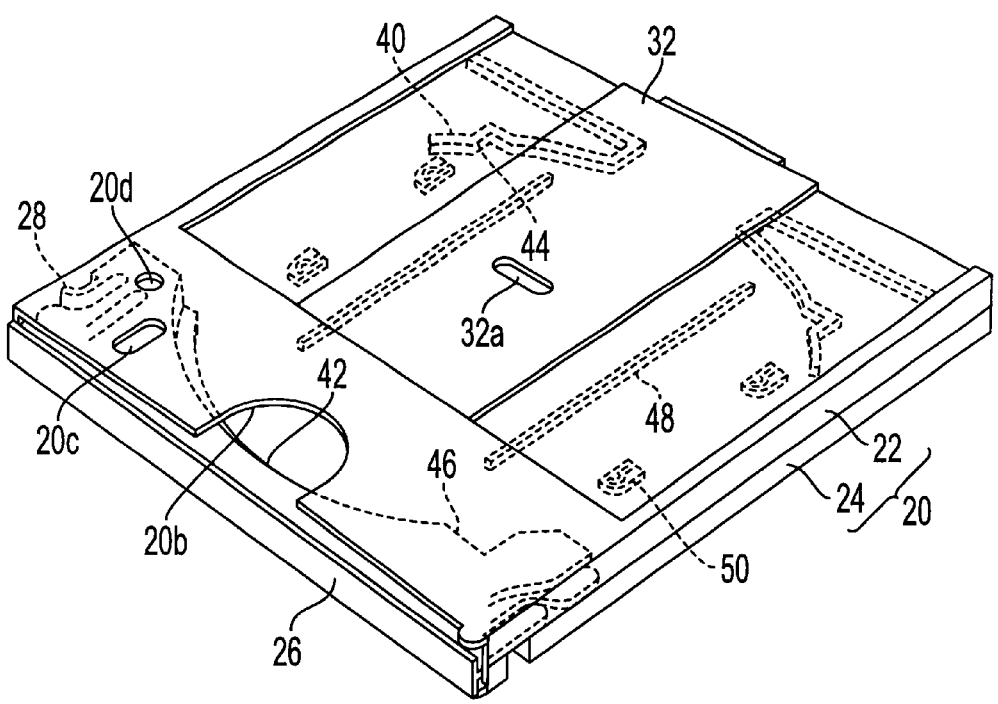
FIG. 2 is a perspective view showing an assembly of the cartridge in FIG. 1.
Figure 3:
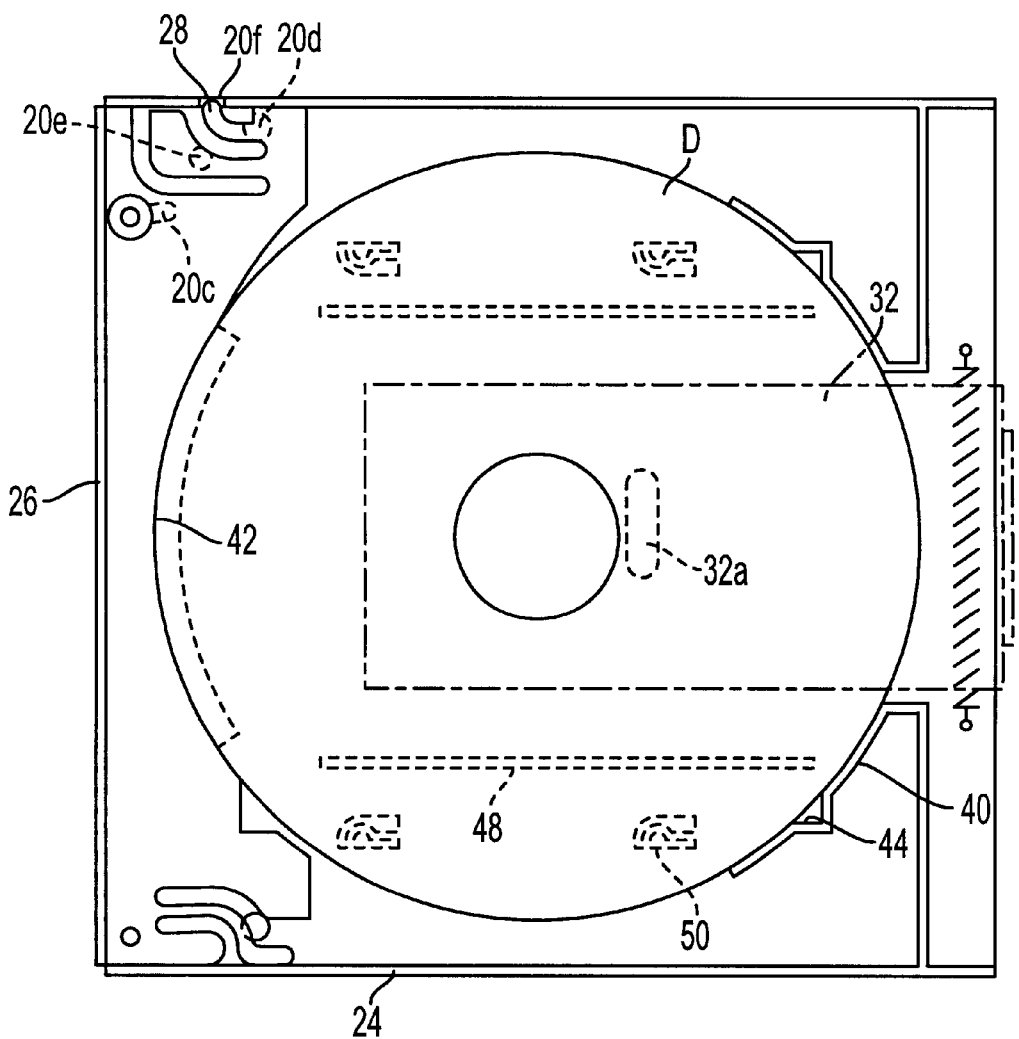
FIG. 3 is a plan view showing a cartridge according to the embodiment of the present invention in a state of accommodating an optical disc having a diameter of 12 cm.

FIG. 1 is an exploded perspective view showing a cartridge for accommodating optical discs of different sizes according to a preferred embodiment of the present invention, and FIGS. 2 and 3 show the cartridge when accommodating an optical disc D having a diameter of 12 cm.

In the drawings, the cartridge to accommodate discs of different sizes according to the preferred embodiment of the present invention includes a main case 20, and a cover 26 pivotably mounted at the main case 20. The main case 20 includes an upper plate 22, and a lower plate 24 coupled to the upper plate 22. The lower plate 24 is coupled with the upper plate 22 so as to form a first longitudinal opening 20a by cooperation with the upper plate 22. The optical disc D is accommodated into the main case 20. The main case 20 generally accommodates the optical disc D having a diameter of 12 cm.

The upper and lower plates 22 and 24 are respectively formed with recording prevention hole 20c and positioning hole 20d. A recording prevention section (not shown) and a positioning pin (not shown) are respectively inserted thereinto. The upper and lower plates 22 and 24 are also respectively formed with locking holes 20f, and terminal holes 20e into which a switch terminal (not shown) of the optical disc recording/reproducing device is inserted.

Figure 4:
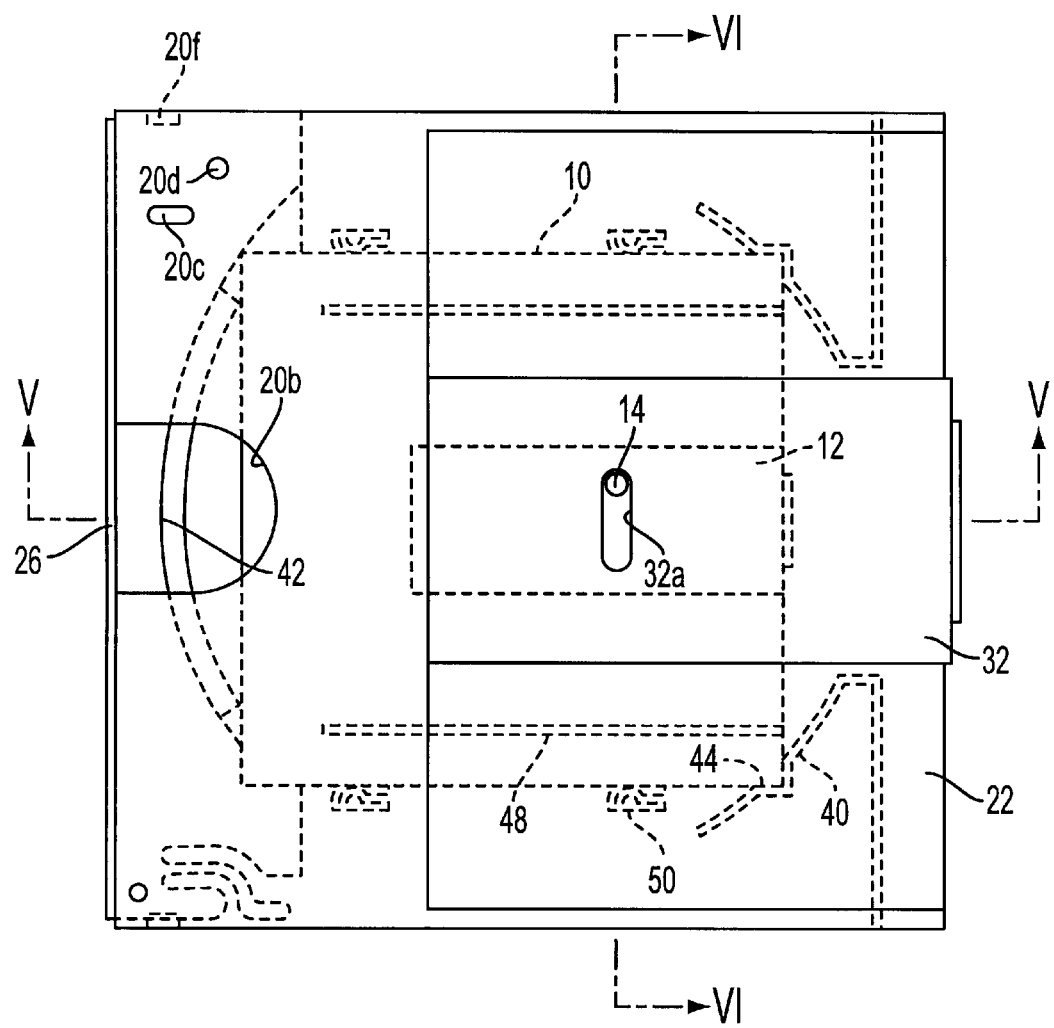
FIG. 4 is a plan view showing a cartridge according to the embodiment of the present invention in a state of receiving an auxiliary case thereinto.
Figure 5:
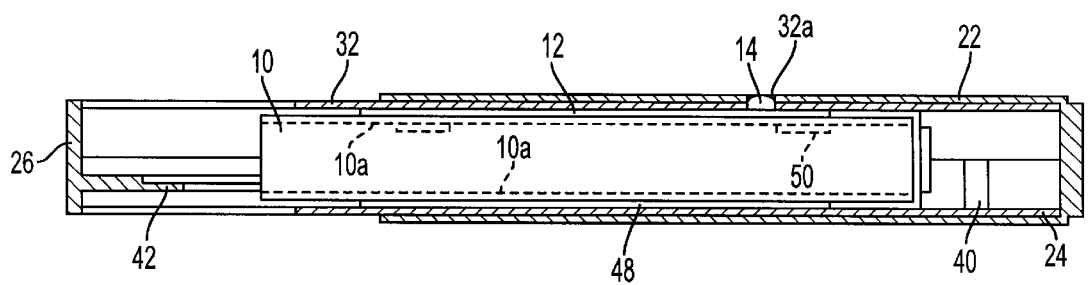
FIG. 5 is a partially cutaway view taken along a V–V' line shown in FIG. 4.
Figure 6:
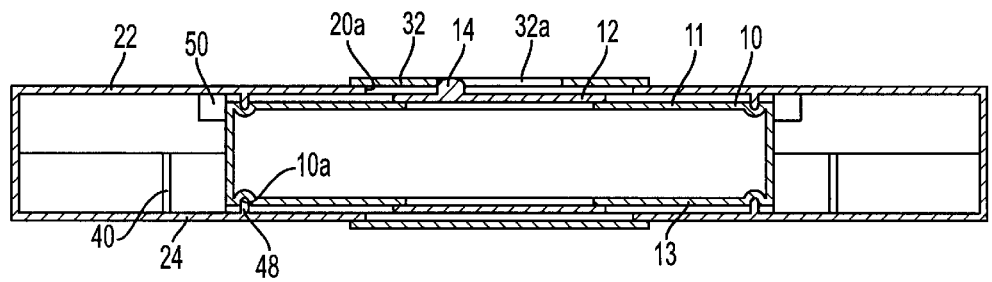
FIG. 6 is a partially cutaway view taken along VI–VI' line shown in FIG. 4.

As shown in FIGS. 4 to 6, an optical disc D' of a smaller diameter than 12 cm, e.g., an optical disc of a diameter of 8 cm is accommodated into the auxiliary case 10 which has an auxiliary shutter 12. The auxiliary case 10 accommodating the optical disc D' is inserted into the main case 20 by an accommodating section formed inside the main case 20 and on the cover 26.

The accommodating section includes first ribs 40 in a circular arc shape, and guiding protrusions 48, which are formed on the upper and the lower plates 22 and 24. The accommodating section also includes second ribs 42 in a circular arc shape formed at the cover 26. The first ribs 40 have a larger radius of curvature than the radius of the optical disc D, and are formed with first receiving recesses 44 into which the auxiliary case 10 is received. The guiding protrusions 48 are respectively formed at the upper and the lower plates 22 and 24 in parallel with the first longitudinal opening 20a, and the auxiliary case 10 is guided along the guiding protrusions 48 into the main case 20.

Meanwhile, both the optical disc D and the auxiliary case 10 accommodated into the main case 20 are prevented from being separated from the main case 20 by the cover 26. The second ribs 42 of the cover 26 have a larger radius of curvature than the radius of the optical disc D. Particulary, the second ribs 42 formed in a circular arc shape preferably have second receiving recesses 46 into which the edges of the auxiliary case 10 are inserted. Opposite to the second receiving recesses 46, a locking rib 28 having a predetermined tension for being locked in the locking hole 20f is formed on the cover 26.

The auxiliary case 10 includes guiding recesses 10a into which the guiding protrusions 48 of the upper and lower surfaces are respectively inserted. The auxiliary case 10 is supported by the support section which is provided in the main case 20. The support section includes a plurality of tension ribs 50 formed at the upper plate 22. The auxiliary case 10 is elastically supported in the main case 20 by the tension ribs 50.

The auxiliary case 10 has a top plate 11 having a longitudinal indent extending to an edge thereof, and a bottom plate 13 connected to the top plate 11. The bottom plate 13 has a longitudinal indent extending to an edge thereof and corresponds with the longitudinal indent of the top plate 11 of the auxiliary case 10 to form a longitudinal opening encompassing a radius of the optical disc D' when the optical disc D' is accommodated in the auxiliary case 10. When the auxiliary case 10 is accommodated in the main case 20, the longitudinal opening of the auxiliary case 10 aligns with the longitudinal opening 20a of the main case 20. The auxiliary shutter 12 is slidably mounted to the top and bottom plates 11, 13 of the auxiliary case 10 and engages the main shutter 32 upon insertion of the auxiliary case 10 in the main case 20.

When the main case 20, which has received the auxiliary case 10, is loaded into the optical disc recording/reproducing device (not shown), the auxiliary shutter 12 is opened by the opening section.

The opening section includes a spring 30 mounted across the first longitudinal opening 20a, a main shutter 32 supported by the spring 30, and a shutter protrusion 14 formed on the auxiliary case 10.

Figure 7:
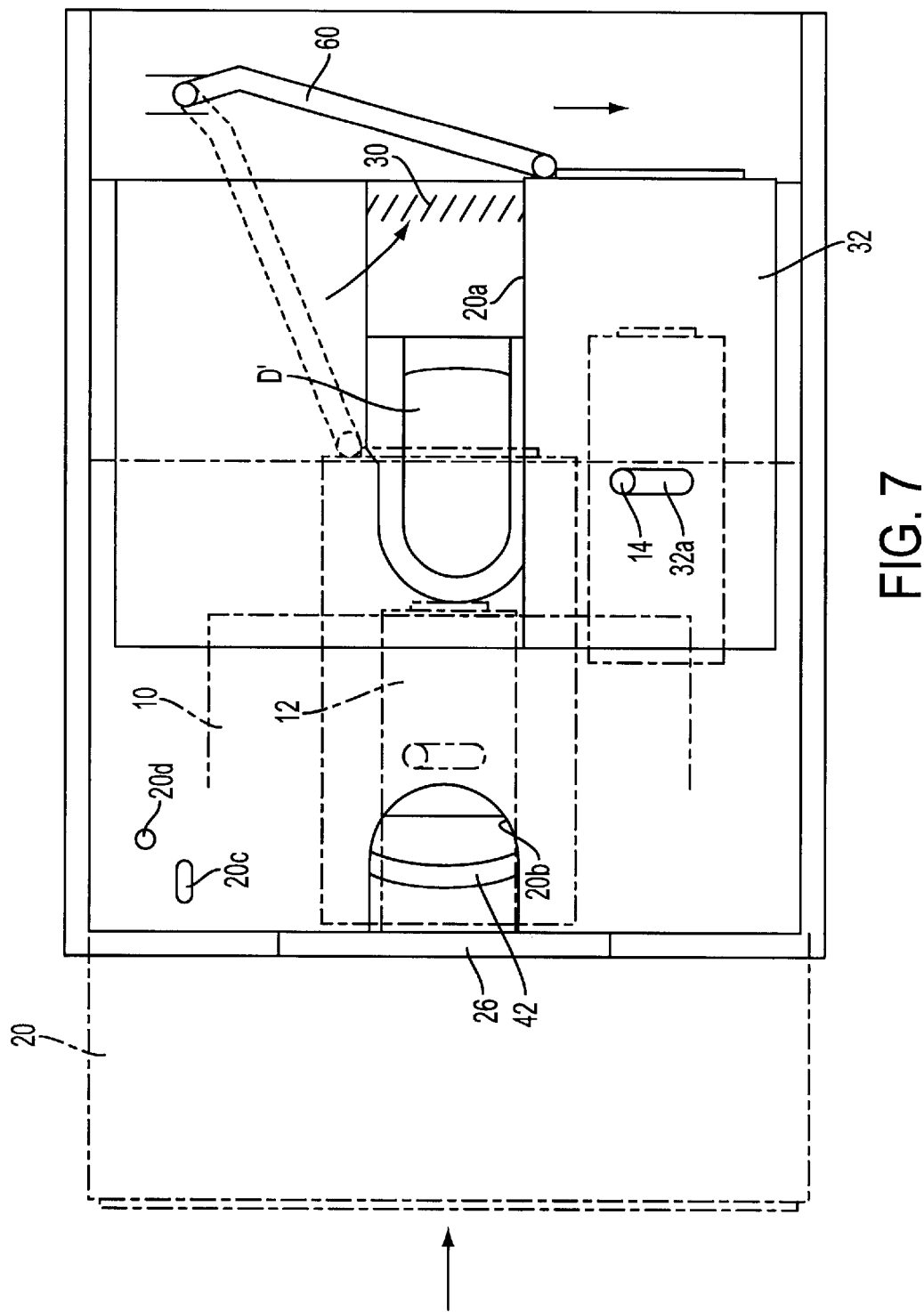
FIG. 7 is a view illustrating an operation of the cartridge to accommodate optical discs of different sizes according to the embodiment of the present invention.

The main shutter 32 is slidably installed to the main case 20 and closes the first longitudinal opening 20a. The main case 20 is loaded into the optical disc recording/reproducing device, a lever 60 of the optical disc recording/reproducing device slides the main shutter 32 to expose the first longitudinal opening 20a. The main shutter 32 is formed with a second longitudinal opening 32a into which the shutter protrusion 14 is inserted when the auxiliary case 10 is accommodated in the main case 10. When the main shutter 32 is slid by a lever 60 of the optical disc recording/reproducing device, the auxiliary shutter 12 is opened by the main shutter 32 and the shutter protrusion 14 (FIG. 7).

An opening 20b is formed opposite to the first longitudinal opening 20a in the main case 20, so the auxiliary case 10 is easily inserted into or withdrawn from the main case 20 by the hand of a user.

Hereinafter, the operation of a cartridge which accommodates optical discs of different sizes according to the preferred embodiment of the present invention is described.

As shown in FIGS. 1 to 3, when the optical disc D having a diameter of 12 cm is inserted into the main case 20, the locking rib 28 of the cover 26 is inserted into the locking hole 20f, thereby preventing the optical disc D from being released from the main case 20. The optical disc D inserted into the main case 20 is positioned by the first and second ribs 40 and 42 which form a circular arc shape.

The main case 20 accommodating the optical disc D is inserted into the optical disc recording/reproducing device, and then the main shutter 32 is opened by the lever 60 of the optical disc recording/reproducing device, and the optical disc D is positioned onto the disc rotary device. Finally, the data is recorded/reproduced by the optical pick-up device (not shown).

On the other hand, when the optical disc D' of a smaller size, i.e., the optical disc having a diameter of 8 cm requires the auxiliary case 10 to be used. As shown in FIGS. 4 to 7, the auxiliary case 10 is guided into the main case 20 by the guiding protrusions 48, and positioned by the first and the second receiving recesses 44 and 46 of the first and the second ribs 40 and 42 which form the circular arc shape. The auxiliary case 10 inserted into the main case 20 is elastically supported by the tension ribs 50 (FIG. 4).

As the main case 20 receives the auxiliary case 10, as shown in FIGS. 5 and 6, the guiding protrusions 48 are inserted into the guiding recesses 10a, and the shutter protrusion 14 of the auxiliary case 10 is inserted into the second longitudinal opening 32a. When the main case 20 is inserted into the optical disc recording/reproducing device, the main shutter 32 is opened by the lever 60 of the optical disc recording/reproducing device. At this point, the auxiliary shutter 12 is opened together with the main shutter 32 by the shutter protrusion 14 of the auxiliary case 10 inserted into the first longitudinal opening 32a of the main case 20 (FIG. 7).

Thus, the main shutter 32 covers the longitudinal openings 20a when the cartridge is not loaded within the optical disc recording/reproducing device, and the main shutter 32 slides to expose the longitudinal opening 20a when the cartridge is loaded within the optical disc recording/reproducing device. The auxiliary shutter 12 covers the longitudinal opening of the auxiliary case 10 when the auxiliary case 10 is not accommodated within the main case 20. The main shutter 32 causes the auxiliary shutter 12 to slide to expose the longitudinal opening of the auxiliary case 10 when the auxiliary case is accommodated within the main case 20 and the cartridge is loaded within the optical disc recording/reproducing device.

As described above with reference to the preferred embodiment according to the present invention, one cartridge can accommodate optical discs of different sizes. Accordingly, the compatibility of the tray is improved so that the cost of reproducing data from optical discs of different sized can be reduced.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A cartridge to accommodate first and second optical discs of different sizes, comprising:
    a main case comprising
        an upper plate, and
        a lower plate coupled to the upper plate,
        wherein said main case accommodates the first optical disc, and the lower plate forming a first longitudinal opening by cooperating with the upper plate;
    a cover pivotably mounted on said main case;
    an auxiliary case comprising an auxiliary shutter, wherein said auxiliary case accommodates the second optical disc having a smaller diameter than that of the first optical disc, wherein said main case accommodates the auxiliary case;
    means for opening said auxiliary shutter;
    means provided in said main case for accommodating said auxiliary case in said main case, wherein said accommodating means comprises
        first ribs formed in a circular arc shape, and
        guiding protrusions respectively formed at the upper and the lower plates,
        wherein the first ribs are formed with first receiving recesses to receive said auxiliary case and support the first optical disc, and the guiding protrusions are parallel with the first longitudinal opening to guide said auxiliary case with respect to said main case; and
    means provided in said main case to support said auxiliary case.

2. The cartridge as claimed in claim 1, wherein said accommodating means is further provided on said cover and further comprises second ribs formed in the circular arc shape provided on said cover, to accommodate the first optical disc, the second ribs formed with second receiving recesses into which edges of said auxiliary case are inserted, and said auxiliary case includes guiding recesses into which the guiding protrusions are inserted.

3. The cartridge as claimed in claim 2, wherein the first and the second ribs form the circular arc shape having a larger radius of curvature than a radius of the first optical disc.

4. The cartridge as claimed in claim 1, wherein said supporting means comprises a plurality of tension ribs formed on the upper plate, to elastically support said auxiliary case within said main case.

5. A cartridge to accommodate first and second optical discs of different sizes, comprising:
    a main case comprising
        a main shutter,
        an upper plate, and
        a lower plate coupled to the upper plate to accommodate the first optical disc, the lower plate forming a first longitudinal opening by cooperating with the upper plate;
    a cover pivotably mounted on said main case;
    an auxiliary case comprising an auxiliary shutter,
        wherein said auxiliary case accommodates the second optical disc having a smaller diameter than that of the first optical disc, and
        wherein said main case accommodates said auxiliary case;
    means for opening the auxiliary shutter and the main shutter;
    means provided in said main case for accommodating said auxiliary case in said main case; and
    means provided in said main case to support said auxiliary case.

6. The cartridge as claimed in claim 5, wherein the opening means comprises:
    a spring mounted across the first longitudinal opening;
    the main shutter formed with a second longitudinal opening and slidably mounted to said main case, to open the auxiliary shutter; and
    a shutter protrusion formed on the auxiliary shutter and inserted into the second longitudinal opening, wherein the spring elastically supports the main shutter.

7. The cartridge as claimed in claim 5, wherein said main case has an opening formed opposite to the first longitudinal opening to enable insertion/withdrawal of said auxiliary case by a user.

8. A cartridge, loadable in an optical disc recording/reproducing device, to accommodate first and second optical discs having first and second diameters, respectively, the first diameter being greater than the second diameter, the cartridge comprising:
    an auxiliary case comprising an auxiliary shutter to accommodate the second optical disc having the second diameter; and
    a main case comprising a receiving opening,
        wherein said main case accommodates
            the first optical disc having the first diameter if the first optical disc is to be read from or recorded on by the optical disc recording/reproducing device, and
            said auxiliary case if the second optical disc is to be read from or recorded on by the optical disc recording/reproducing device.

9. The cartridge as claimed in claim 8, further comprising a cover, pivotally mounted to an end of said main case so as to alternately cover and expose said receiving opening, to maintain said auxiliary case within said main case if said auxiliary case is accommodated in said main case, and to maintain the first optical disc in said main case if the first optical disc is accommodated in said main case.

10. The cartridge as claimed in claim 9, wherein:

said main case comprises first ribs in arc shapes forming first parts of a circle, wherein said first ribs include respective first receiving recesses;

said cover comprises second ribs in arc shapes; and said second ribs form second parts of the circle when said cover covers said receiving opening, said first and second ribs maintaining the first optical disc within the circle when the first optical disc is accommodated in said main case, said second ribs having respective second receiving recesses, said first and second receiving recesses respectively receiving corners of said first auxiliary case when said auxiliary case is accommodated in said main case.

11. The cartridge as claimed in claim 10, wherein:

said main case has guiding protrusions; and said auxiliary case has guiding recesses to respectively engage said guiding protrusions and guide said auxiliary case during insertion within said main case.

12. The cartridge as claimed in claim 11, wherein:

said main case includes a first plate having a first longitudinal indent extending to an edge thereof, a second plate connected to said first plate and having a second longitudinal indent extending to an edge thereof, said second longitudinal indent corresponding with said first longitudinal indent to form a first longitudinal opening encompassing a radius of the first optical disc when the first optical disc is accommodated in said main case and a radius of the second optical disc when the second optical disc is accommodated in said auxiliary case and said auxiliary case is accommodated in said main case, and a main shutter slidably mounted to said first and second plates; and said auxiliary case includes a third plate having a third longitudinal indent extending to an edge thereof, a fourth plate connected to said third plate and having a fourth longitudinal indent extending to an edge thereof, said fourth longitudinal indent corresponding with said third longitudinal indent to form a second longitudinal opening encompassing a radius of the second optical disc when the second optical disc is accommodated in said auxiliary case and said auxiliary case is accommodated in said main case, and an auxiliary shutter slidably mounted to said third and fourth plates and engages said main shutter upon insertion of said auxiliary case in said main case;

wherein said main shutter covers said first longitudinal opening when the cartridge is not loaded within the optical disc recording/reproducing device, and said main shutter slides to expose said first longitudinal opening when the cartridge is loaded within the optical disc recording/reproducing device, said auxiliary shutter covers said second longitudinal opening when said auxiliary case is not accommodated within said main case, and said main shutter causes said auxiliary shutter to slide to expose said second longitudinal opening when the auxiliary case is accommodated within said main case and the cartridge is loaded within the optical disc recording/reproducing device.

13. The cartridge as claimed in claim 12, wherein:

said main case has a locking hole; and said cover has first and second sides opposite to each other, wherein the first side is pivotally mounted to said main case, and the second side has a locking rib to engage said locking hole upon rotation of said cover to cover said receiving opening.

14. The cartridge as claimed in claim 8, wherein:

said main case has guiding protrusions; and said auxiliary case has guiding recesses to respectively engage said guiding protrusions and guide said auxiliary case during insertion within said main case.

15. The cartridge as claimed in claim 8, wherein:

said main case includes a first plate having a first longitudinal indent extending to an edge thereof, a second plate connected to said first plate and having a second longitudinal indent extending to an edge thereof, said second longitudinal indent corresponding with said first longitudinal indent to form a first longitudinal opening encompassing a radius of the first optical disc when the first optical disc is accommodated in said main case and a radius of the second optical disc when the second optical disc is accommodated in said auxiliary case and said auxiliary case is accommodated in said main case, and a main shutter slidably mounted to said first and second plates; and said auxiliary case includes a third plate having a third longitudinal indent extending to an edge thereof, a fourth plate connected to said third plate and having a fourth longitudinal indent extending to an edge thereof, said fourth longitudinal indent corresponding with said third longitudinal indent to form a second longitudinal opening encompassing a radius of the second optical disc when the second optical disc is accommodated in said auxiliary case and said auxiliary case is accommodated in said main case, and an auxiliary shutter slidably mounted to said third and fourth plates and engages said main shutter upon insertion of said auxiliary case in said main case;

wherein said main shutter covers said first longitudinal opening when the cartridge is not loaded within the optical disc recording/reproducing device, and said main shutter slides to expose said first longitudinal opening when the cartridge is loaded within the optical disc recording/reproducing device, said auxiliary shutter covers said second longitudinal opening when said auxiliary case is not accommodated within said main case, and said main shutter causes said auxiliary shutter to slide to expose said second longitudinal opening when the auxiliary case is accommodated within said main case and the cartridge is loaded within the optical disc recording/reproducing device.

16. The cartridge as claimed in claim 8, wherein:

said main case has a locking hole; and said cover has first and second sides opposite to each other, wherein the first side is pivotally mounted to said main case, and the second side has a locking rib to engage said locking hole upon rotation of said cover to cover said receiving opening.

17. The cartridge as claimed in claim 16, wherein said locking rib is elastic, is biased in a first direction by a side of said main case upon partial covering of said receiving hole by said cover and, biased in a second direction opposite the first direction upon total covering of said locking hole by said cover, and said locking rib is exposed through said locking hole to be biased in the first direction to enable said cover to expose said receiving opening.

18. The cartridge as claimed in claim 8, wherein said main case comprises:
   a first plate having a first longitudinal indent extending to an edge thereof; and
   a second plate connected to said first plate and having a second longitudinal indent extending to an edge thereof, said second longitudinal indent corresponding with said first longitudinal indent to form a longitudinal opening, said longitudinal opening enabling a user to grip said auxiliary case while said auxiliary case is accommodated in said main case, to remove said auxiliary case from said main case.

19. The cartridge as claimed in claim 8, wherein said main case comprises a plurality of tension ribs to elastically support said auxiliary case within said main case.

20. A cartridge to accommodate first and second optical discs of different diameters, comprising:
   an auxiliary case to accommodate the second optical disc having a second diameter, comprising
      a first opening extending along a radius of the accommodated second optical disc, and
      an auxiliary shutter slidably movable to cover and expose said first opening; and
   a main case to accommodate the first optical disc having a first diameter greater than the second diameter and said auxiliary case, said main case comprising
      a second opening extending along a radius of the accommodated second optical disc and the radius of the first optical disc, and
      a main shutter connected to said auxiliary shutter to expose and cover said second opening, and moving said auxiliary shutter to correspondingly expose and cover said first opening if said auxiliary case is accommodated in said main case.

21. The cartridge as claimed in claim 20, wherein said main shutter moves said auxiliary shutter simultaneously to correspondingly expose and cover said first opening if said auxiliary case is accommodated in said main case.

22. The cartridge as claimed in claim 8, wherein said main case further comprises a main shutter; wherein said auxiliary case further comprises an auxiliary shutter; and further comprising a means for opening the main shutter and the auxiliary shutter.

* * * * *